United States Patent [19]

Heilman et al.

[11] Patent Number: 4,525,557
[45] Date of Patent: Jun. 25, 1985

[54] CATALYST AND PROCESS FOR THE POLYMERIZATION OF ETHYLENE

[75] Inventors: William J. Heilman; Richard A. Kemp, both of Houston, Tex.

[73] Assignee: Gulf Oil Corporation, Pittsburgh, Pa.

[21] Appl. No.: 584,165

[22] Filed: Feb. 27, 1984

[51] Int. Cl.³ .................. C08F 4/44; C08F 110/02; C01B 15/14
[52] U.S. Cl. .................. 526/128; 526/151; 526/169.2; 526/352; 423/325; 502/116
[58] Field of Search .................. 526/128, 169.2, 151, 526/352

[56] References Cited

U.S. PATENT DOCUMENTS 3,943,067  3/1976  Chan et al. .................. 502/107
4,374,755  2/1983  Berge et al. .................. 526/127

Primary Examiner—Paul R. Michl
Assistant Examiner—F. Teskin
Attorney, Agent, or Firm—Deane E. Keith; Forrest D. Stine; Richard C. Gaffney

[57] ABSTRACT

A process for the polymerization of ethylene using as the catalyst a novel solid catalytic complex comprising Mg, Si, and either Ti or V. An organoaluminum co-catalyst is also employed. The novel catalytic complex is prepared by a process which comprises:
(a) reacting a silanol having the formula

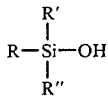

where R, R' and R" can be the same or different and are selected from the group consisting of aliphatic hydrocarbons having from 2 to 12 carbon atoms or phenyl or substituted phenyl where such substituents have from one to three alkyl groups, and alkyl group having from one to four carbon atoms and where R" can additionally be selected from —OH, with a magnesium dialkyl where each alkyl group can have from one to 12 carbon atoms to form a first reaction product;
(b) reacting said first reaction product with trichlorosilane to form a second reaction product; and
(c) reacting said second reaction product with a metal compound having the formula:

$$MeX_4$$

where Me can be titanium or vanadium and wherein X is chlorine, bromine, or $-OH_1$ where $R_1$ is a hydrocarbon radical having from 1 to 10 carbon atoms and wherein at least two of the X substituents are selected from chlorine and bromine to form the desired catalytic complex, and wherein said catalytic complex the molar ratio of Me to Si is from about 0.33:1 to 11:1 and wherein the molar ratio of Me to Mg is from 0.33:1 to 11:1.

10 Claims, No Drawings

CATALYST AND PROCESS FOR THE POLYMERIZATION OF ETHYLENE

BACKGROUND OF THE INVENTION

1. Field of the Invention

The present invention relates to a novel catalytic material useful for the polymerization of ethylene and a process for polymerizing ethylene using this catalytic material.

2. Description of the Prior Art

The polymerization of olefins, such as ethylene and propylene, using the so-called Ziegler-type catalysts, has been known for some time. These Ziegler-type catalysts are defined, for example, in U.S. Pat. No. 3,989,881, as combinations of transition metal compounds of Groups IVB–VIB of the Periodic Table and organometallic compounds of Groups IA–IIIA of the Periodic Table. However, many of the conventional catalysts do not possess satisfactorily high catalytic activity for the production of polyethylene and thus it is difficult to utilize the resulting polymers without removal of catalyst residue following polymerization. In addition, when polyethylene is prepared by the so-called liquid phase slurry type polymerization, the bulk density of the resulting polyethylene powder is frequently less than desired.

Moreover in the process described in the prior art, transition metal compounds are contacted with solid carriers which limits the ability of the transition metal compounds to be evenly distributed across the surface of the solid carrier.

With some inert catalyst carriers such as silica, the number and distribution of sites available for complexation to the transition metal is difficult to control. For example, it is well known to those skilled in the art that when silica is used as a carrier and the number of sites is decreased by a process such as calcination, a clustering of the remaining sites occurs which further compounds the problem. The use of silanols allows for distribution of the sites to be "dialed into" the catalyst carrier. This allows more sites per unit of surface area and resultantly more activity.

Additionally, most prior polyethylene catalysts have poor sensitivity to hydrogen; that is, they require a large amount of $H_2$ with ethylene (up to a molar ratio of 1:1) on order to effect significant changes in polymer chain length, and hence, melt index. These silanol-based catalysts demonstrate a suprising sensitivity to $H_2$ with the MI varying over a substantial range with relatively small changes in $H_2$ pressure. This is an advantage due to ease of processability and wide flexibility in the type of polyethylenes which can be made.

SUMMARY OF THE INVENTION

In accordance with the invention, a novel solid catalytic complex has been discovered for the polymerization of ethylene which is sufficiently active so that complex and expensive purification procedures to remove catalyst residues need not be employed. This novel solid catalytic complex comprises magnesium, silicon, and titanium or vanadium and is prepared by a process which comprises:

(a) reacting a silanol having the formula

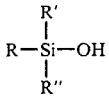

where R, R' and R" can be the same or different and are selected from the group consisting of aliphatic hydrocarbons having from 2 to 12 carbon atoms or phenyl or substituted phenyl where such substituents have from one to three alkyl groups, such alkyl group having from one to four carbon atoms and wherein R" can additionally be selected from —OH, with a magnesium dialkyl where each alkyl group can have from one to 12 carbon atoms to form a first reaction product;

(b) reacting said first reaction product with trichlorosilane to form a second reaction product; and (c) reacting said second reaction product with a metal compound having the formula:

$$MeX_4$$

where Me can be titanium or vanadium and wherein X is chlorine, bromine, or —$OR_1$ where $R_1$ is a hydrocarbon radical having from 1 to 10 carbon atoms and wherein at least two of the X substituents are selected from chlorine and bromine to form the desired catalytic complex, and wherein said catalytic complex the molar ratio of Me to Si is from about 0.33:1 to 11:1 and wherein the molar ratio of Me to Mg is from 0.33:1 to 11:1.

DESCRIPTION OF PREFERRED EMBODIMENTS PREPARATION OF THE NEW COMPOSITIONS OF THIS INVENTION

The new compositions of this invention comprise magnesium, silicon and titanium or vanadium, but it is not certain how these elemental components are chemically or physically combined. The new composition is prepared essentially in three steps. In step one, a silanol having the formula:

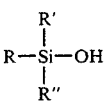

where R, R' and R" can be the same or different and are selected from the group consisting of aliphatic hydrocarbons having from 2 to 12 carbon atoms or phenyl or substituted phenyl where such substituents have from one to three alkyl groups having from one to four carbon atoms and where R" can additionally be selected from —OH is reacted with a magnesium dialkyl wherein each alkyl group can have from one to 12 carbon atoms to form a first reaction product.

This first reaction product is then reacted with trichlorosilane to form a second reaction product which is then reacted with a titanium or vanadium halide to form the desired catalytic complex. The amounts of the various components to form the desired catalytic complex are set forth below.

SILANOL

The silanol which can be utilized in forming the novel catalytic compositions of this convention can be any mono or dihydroxy containing silanol having the formula:

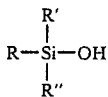

where R, R' and R" can be the same or different and are selected from the group consisting of aliphatic hydrocarbons having from 2 to 12 carbon atoms or phenyl or substituted phenyl where such substituents have from one or three alkyl groups having from one to four carbon atoms and where R" can additionally be selected from —OH. Preferred among the silanols are those wherein only a single OH group is present and wherein substituent R groups are phenyl or substituted phenyl. The most preferred silanol is triphenylsilanol.

Other silanols which can be utilized include triethylsilanol, diethylbutylsilanol, tributylsilanol, tryhexylsilanol, triisobutylsilanol, hexyldioctylsilanol, diphenylbutylsilanol, diphenylsilanediol, ditolylsilanediol, and mesityldiphenylsilanol.

MAGNESIUM DIALKYL

The dialkylmagnesium compound that can be utilized to form the active catalytic compositions of this invention can be any dialkylmagnesium compound where one or both of the alkyl groups attached to the magnesium compound have from 1 to 12 carbon atoms. Preferably, both alkyl groups on the dialkylmagnesium compound are the same and more preferably the alkyl groups have from 2 to 8 carbon atoms per molecule.

Examples of suitable dialkylmagnesium compounds to employ include ethylbutylmagnesium, dibutylmagnesium, diisobutylmagnesium, dihexylmagnesium, dioctylmagnesium, didecylmagnesium and propylbutylmagnesium.

As noted above, the silanols are reacted with the magnesium dialkyl to form a first reaction product. Usually the silanol is a solid which is slurried in an inert solvent such as heptane and the dialkylmagnesium compound is added slowly to the slurry of the silanol compound. The dialkylmagnesium is also suitably diluted with an inert solvent such as heptane before its addition to the silanol. The reaction between the silanol and the dialkylmagnesium is exothermic and the addition of the dialkylmagnesium, the stirring rate and the amount of solvent are coordinated so as to keep the reaction temperature within reasonable limits. Usually, the conditions of reaction are ambient conditions of temperature and pressure, although temperatures from 25° C. to 70° C. as well as pressure from subatmospheric to pressures of 100 psig or more can be utilized but with no apparent advantages. In general, a sufficient amount of the dialkylmagnesium compound is added to the silanol so that all of the hydroxyl groups attached to the silanol can at least theoretically be reacted with the magnesium. Preferably, a slight excess such as a 10% excess of the magnesium compound is preferred. Thus, suitable molar ratios of the magnesium dialkyl to the hydroxyl groups present in the silanol is from about 1:1 to 5:1 and more preferably about 1.1:1 to 1.5:1.

The reaction product of the silanol with the dialkylmagnesium is then reacted with trichlorosilane to form a second reaction product. The reaction conditions and the desirability of the presence of an inert solvent are the same as those described above for the reaction of the dialkylmagnesium compound with the silanol. The molar ratio of the trichlorosilane to the magnesium in the first reaction product is suitably from 1:1 to 10:1 and preferably is from 1:1 to 5:1.

The second reaction product is then reacted with a vanadium or titanium halide having the formula:

$$MeX_4$$

where Me can be titanium or vanadium and wherein X is chlorine, bromine, or —$OR_1$ where $R_1$ is a hydrocarbon radical having from 1 to 10 carbon atoms and wherein at least two of the X substituents are selected from chlorine and bromine.

From an activity standpont, titanium is the preferred metal whereas if a higher melt index product is desired, then vanadium is the preferred metal. It is further preferred that X be chlorine and thus the most preferred metal compounds are titanium tetrachloride and vanadium tetrachloride. Examples of other suitable metal halides to employ in formulating the novel catalytic compositions of this invention include: titanium bromotrichloride; vanadium dibromodichloride; titanium methoxytrichloride; vanadium dibutoxydichloride; titanium diheptoxydibromide.

The reaction conditions to employ to formulate the final catalytic species are the same as those described above with respect to the formation of the first and second reaction products. Thus the final catalytic species useful in the process of this invention can be formulated in a single reaction vessel by sequential additions of the dialkylmagnesium compound, the trichlorosilane, and the metal halide to the silanol.

The molar ratio of the titanium or vanadium halide to the magnesium is suitably from 0.33:1 to 11:1 and is more preferably from 1:1 to 5:1.

The above described catalytic material is, of course, combined with an organo-aluminum component or co-catalyst to form the final catalyst. The function of the organo-aluminum component is to partially reduce the vanadium or titanium in the catalytic complex to an active catalytic state. Usually, the titanium or vanadium magnesium catalyst is added to a liquid phase reaction zone to be reacted with a separately added unsupported organo-aluminum compound such as triisobutylaluminum to form a combined material (wherein the vanadium or titanium is partially reduced to the active catalytic state) for polymerization of ethylene under liquid phase polymerization reaction conditions.

ORGANO-ALUMINUM COMPOUND

Organo-aluminum compounds which are useful as co-catalysts for the production of polyethylene are well known in the art. Preferred organo-aluminum compounds are the aluminum trialkyls wherein the alkyl groups have between 1 to 12 carbon atoms such as, for example, triethylaluminum, triisobutylaluminum and trioctylaluminum. The particular type of organo-aluminum compound or aluminum trialkyl is not deemed critical to this invention, and the art is sufficiently developed so that one having ordinary skill in this art would know the particular type and amount of organo-aluminum compound to employ to achieve the desired results, i.e., reduction of the vanadium compound or titanium compound to a preferred oxidation state between about 2 and 3.5.

As noted above, the organo-aluminum compound is added to a liquid phase reaction zone containing the new compositions of this invention together with an inert solvent such as heptane which serves as a heat sink. The solvent is of course employed in excess as is well known to those having ordinary skill in the art.

The charge stock for the process of this invention is a gaseous stream containing ethylene and from about 5 to 30 mole percent hydrogen as a molecular weight control agent. The charge stock can also contain an inert gas such as nitrogen. Thus, normally, the charge stock can contain between 65 and 94 mole percent ethylene, from 1 to 10 mole percent of an inert gas such as nitrogen and from 5 to 30 mole percent free molecular hydrogen.

In addition, the charge stock can contain minor amounts of a $C_3$ to $C_8$ alpha-olefin, which is utilized not to produce co-polymers, but which serve additionally as a secondary means to control molecular weight and hence melt index. Suitable alpha olefins include: propylene, butene-1, isobutylene, hexene-1, and octene-1. The amount of the $C_3$ to $C_8$ alpha-olefin which can suitably be employed is from 1 to 15 mole percent of the ethylene containing charge stock and is more usually from 1 to 5 mole percent.

The molar ratio of the organo-aluminium component to the new compositions of this invention can be varied over a wide range. In general, the molar ratio of the organo-aluminum reducing agent to the new compositions of this invention can be in the range from 0.3:1 to 1,000:1 or even higher so long as overreduction of the vanadium-magnesium or titanium-magnesium complex does not occur. The preferred molar ratio of the organo-aluminum compound to the new compositions of this invention lies between 1:1 and 500:1 and more preferably between 1:1 and 25:1.

The amount of the total catalyst to be employed in promoting the ethylene polymerization reaction is comparatively small, i.e., a catalytic amount. Generally, amounts from 0.01 to 5.0 percent by weight based on the total weight of the ethylene charge stock are satisfactory although amounts as small as 0.001 percent by weight are sometimes permissible and larger amounts of up to 20 weight percent can also be employed.

As briefly discussed above, the process of the present invention is carried out in a liquid or slurry phase with the catalyst components usually being separately added to a liquid phase reaction zone containing an inert solvent such as heptane or hexane.

The liquid phase polymerization reaction can be conducted under liquid phase polymerization conditions which are well known to those having ordinary skill in the art. The reaction temperature can suitably be from 80° C. to 125° C. or higher if desired. Preferably the reaction temperature is from 85° C. to 110° C. The reaction pressures are not critical and the pressure can vary from sub-atmospheric to 1000 psig or more. Generally speaking, superatmospheric pressure is preferred and pressures in the range from 200 to 600 psig constitute the preferred range. The process of the present invention is not limited to any particular conditions of temperature and pressure under which the polymerization of ethylene occurs.

Having generally described the invention, a more complete understanding can be obtained by reference to the following specific examples which are provided herein for purposes of illustration only and are not intended to be limiting in any manner unless otherwise specified.

PREPARATION OF NOVEL COMPOSITIONS OF THIS INVENTION

EXAMPLE I—TiCl$_4$

Triphenylsilanol (3.47 g) was slurried in heptane (60 cc) in a 250 ml, 3 necked flask which had been purged with nitrogen to eliminate all traces of air. The flask was also equipped with a magnetic stirbar and pressure-equalizing dropping funnel. Dibutylmagnesium (20 cc of a 0.7M solution in heptane) was added dropwise and the resulting white slurry was stirred at room temperature for an hour. Trichlorosilane (5 cc) in heptane (20 cc) was added dropwise and stirred for two hours. Titanium tetrachloride (5 cc) in heptane (20 cc) was added dropwise to the slurry and an immediate reaction occurred to give a brown slurry which was stirred at room temperature for one hour, then filtered, washed three times with 30 cc portions of heptane, and dried in vacuo to yield a brown solid having the following elemental analysis.

% Mg=9.3
% Ti=6.8
% Cl=40.7

EXAMPLE II—VCl$_4$

Example I was repeated except 5 cc of vanadium tetrachloride were used in place of the 5 cc of titanium tetrachloride. A brown solid was recovered which had an elemental analysis as follows:

% Mg=4.1
% V=21.7
% Cl=57.3

EXAMPLE III—TiCl$_3$OBU

Example I was repeated except the 5 ccs of titanium tetrachloride were replaced with 10.9 grams of BuO-TiCl$_3$ where "Bu" means butyl. A brown solid was recovered but an elemental analysis was not obtained.

EXAMPLE IV—TiCl$_4$

Example I was repeated except the titanium tetrachloride (2.38 grams or 12.55 millimoles) was added in an equimolar ratio with triphenylsilanol rather than in gross excess. A light brown solid was recovered which had an elemental analysis as follows:

% Mg=9.6
% Ti=6.7
% Cl=37.8

It should be noted that this elemental analysis was substantially the same as the elemental analysis for Example I above showing that most of the excess titanium was removed with the washing. As will be shown in the Examples below, however, despite the fact that the catalyst of Examples I and IV appear to be the same from an elemental analysis standpoint, the catalyst from Example IV was substantially more active.

EXAMPLE V—VCl$_4$

Example IV was repeated except 2.40 grams of vanadium tetrachloride were used in place of the 2.38 grams of titanium tetrachloride. A brown solid was recovered which was not subjected to elemental analysis.

EXAMPLE VI—TiCl$_4$—No Silane

Example I was repeated except the addition of the trichlorosilane was omitted. A yellow catalyst was recovered which had the following elemental analysis:

% Mg=0.6
% Ti=12.1
% Cl=35.2.

EXAMPLE VII—TiCl₄—Silanediol

Diphenylsilanediol (2.7 g=12.5 millimoles) in 60 cc heptane was treated with 36 ml of Bu₂Mg (0.7M in C₇, 25.7 millimoles) at room temperature for 2 hours. TiCl₄ (2.38 g=12.5 millimoles in 10 cc C₇) was added dropwise, forming a dark precipitate immediately upon addition. The slurry was stirred at ambient temperature for two hours, then the slurry was filtered, washed three times with 30 cc portions of heptane, and dried in vacuo.

thereafter since very little hydrogen is consumed in the reaction.

Initially, 1.02 kilograms of heptane were added to the one gallon reactor followed by the addition, unless otherwise indicated, of 5.0 mls of a 25% solution of triisobutylaluminum in heptane for the purpose of scavenging any polar impurities in the solvent and to function as a co-catalyst. This amount of triisobutylaluminum represented a considerable excess over stoichiometry.

A catalyst was then added in the amount shown in Table 1, the hydrogen was added to the desired partial pressure and finally the reactor brought to total pressure by the addition of ethylene.

TABLE I

Polymerization of Ethylene at 85° C. and 200 PSIG in Slurry Phase

| Example Number | Catalyst Prepared In Accordance With The Following Example Number | Transition Metal in Catalyst | Co-Catalyst | H₂ % | Activity[1] | MI[2] | Bulk Density gms/cc. |
|---|---|---|---|---|---|---|---|
| 1 | Example I | Ti | TOAL[3] | 15 | 22,652 | 0.3 | 0.26 |
| 2 | Example I | Ti | TOAL[4] | 25 | 10,250 | 2.7 | 0.21 |
| 3 | Example I | Ti | TIBAL | 15 | 18,881 | 0.3 | 0.26 |
| 4 | Example I | Ti | TIBAL | 25 | 7,482 | 3.8 | 0.32 |
| 5 | Example II | V | TOAL | 15 | 3,300 | 8.2 | 0.35 |
| 6 | Example II | V | TIBAL | 15 | 3,898 | 0.9 | 0.27 |
| 7 | Example III | Ti | TOAL | 15 | 4.424 | 0.6 | 0.23 |
| 8 | Example IV | Ti | TOAL | 15 | 41,795 | 0.2 | 0.25 |
| 9 | Example IV | Ti | TIBAL | 15 | 28,095 | 0.2 | 0.25 |
| 10 | Example V | V | TOAL | 15 | 2,294 | 3.9 | 0.30 |
| 11 | Example V | V | TIBAL | 15 | 2,184 | 3.4 | 0.30 |
| 12 | Example VI | Ti | TOAL | 15 | 2,660 | 0.3 | 0.19 |
| 13 | Example VI | Ti | TIBAL | 15 | 1,858 | 0.3 | 0.22 |
| 14 | Example VII | Ti | TOAL | 15 | 12,146 | 0.1 | 0.22 |
| 15 | Example VII | Ti | TIBAL | 15 | 6,890 | 0.1 | 0.18 |
| 16 | Example VIII | Ti | TOAL | 15 | 23,741 | 0.3 | 0.25 |
| 17 | Example VIII | Ti | TIBAL | 15 | 14,645 | 0.3 | 0.25 |
| 18 | Example II | V | TOAL | 25 | 2,316 | 13.5 | 0.36 |
| 19 | Example II | V | TIBAL | 25 | 3,267 | 8.3 | 0.29 |

[1]Activity is grams of polymer per gram of catalyst per hour.
[2]MI means melt index as per ASTM Test D1238 Condition E.
[3]TOAL mean trioctylaluminum.
[4]TIBAL means triisobutylaluminum.

EXAMPLE VIII—TiCl₄—Silanediol—Trichlorosilane

Diphenylsilanediol (2.16=10 millimoles) in 60 cc heptane was treated with 28.6 ml of Bu₂Mg (0.7M in heptane, 20 millimoles) at room temperature dropwise and the stirring was continued for 1 hour at room temperature. Trichlorosilane (5 in 10 cc of heptane) was added dropwise forming a fluffy precipitate upon addition which was stirred for 2 hours at room temperature. TiCl₄ [1.9 g (10 millimoles) in 10 cc of heptane] was added which formed a yellow precipitate immediately. The slurry was stirred for 2 hours at room temperature, and the workings of the catalyst was as in Example VII to yield a yellow solid.

A series of runs was made using the compositions of Examples I through VIII above as catalysts together with trioctylaluminum or triisobutylaluminum as the co-catalyst to produce polyethylene under liquid phase slurry reaction conditions.

In each of the examples in Table 1 below, the runs were made in a one gallon batch reactor operated at 85° C., 200 psig pressure and a hydrogen partial pressure ranging from 30 to 50 psig (the hydrogen partial pressure is twice the percent hydrogen shown in Table 1). All of the runs were made for one hour. The remainder of the gas phase was of course ethylene which was automatically fed into the one gallon reactor to achieve and maintain the total pressure at 200 psig. The hydrogen was added initially but no hydrogen was added Referring to Table I, a comparison of Examples 1 and Example 8 shows that a much more active catalyst is achieved when a stoichiometric amount of titanium tetrachloride to dibutylmagnesium is employed, i.e., the activity went from 22,652 grams of polymer per gram of catalyst per hour in Example 1 to 41,795 grams of polymer per gram of catalyst per hour for Example 8. A comparison of Examples 3 and 9 shows the same effect except using triisobutylaluminum rather than trioctylaluminum as the co-catalyst.

A comparison of Examples 1 and 2 and a similar comparison of Examples 3 and 4 shows that as the hydrogen concentration increases the melt index of the product increases as desired. A comparison of Examples 5 and 6 with 1 and 3 shows that when vanadium tetrachloride is used in lieu of titanium tetrachloride that increased melt index products are obtained but at a sacrifice in activity for the catalyst. It is especially worthy of note that the use of vanadium tetrachloride using trioctylaluminum as the co-catalyst results in an unexpectedly high melt index polyethylene compared with the use of triisobutylaluminum as the co-catalyst (Compare Example 5 with Example 6.) Note that Examples 1 and 3 which utilize titanium tetrachloride for the catalyst preparation, results in the production of a polyethylene having the same melt index (0.3) regardless of whether trioctyaluminum or triisobutylaluminum is used as the co-catalyst. When vanadium tetrachloride is used, a co-catalyst effect is very noticeable, i.e., the normal octylaluminum co-catalyst results in a polyethylene having a melt index of 8.2 while the triisobutylaluminum gives a melt index product of only 0.9.

A comparison of Examples 5 and 6 with 10 and 11 shows that when the vanadium is employed in a stoichiometric amount, the activity of the catalyst is decreased while the melt index of the product is increased. This should be contrasted with the titanium catalyst where the stoichiometric catalyst is much more active and the melt index of the products is decreased (compared Examples 8 and 9 with 1 and 3).

The only difference between Examples 16 and 17 and 8 and 9 is that in Examples 16 and 17, the silanol has two phenyl and two hydroxyl groups whereas in Examples 8 and 9 the silanol has three phenyl and one hydroxyl group. It is noted that the triphenyl silanol is the more active catalyst but produces a polyethylene having a lower melt index.

Example 18 is same as Example 5 except 25% $H_2$ MI goes from 8.2 to 13.5 showing $H_2$ sensitivity as expected.

Example 19 is same as Example 6 except 25% $H_2$ MI goes from 0.9 to 8.3 showing $H_2$ sensitivity as expected.

The Examples in Table 1 show overall that the most active catalyst is obtained using the titanium species especially when the triphenylsilanol is employed and when the titanium is used in stoichiometric quantities with respect to the silica and more especially when trichlorosilane is employed.

Obviously, many modifications and variations of the invention, as hereinabove set forth, can be made without departing from the spirit and scope thereof, and therefore only such limitations should be imposed as are indicated in the appended claims.

We claim:

1. A process for the polymerization of ethylene which comprises polymerizing ethylene in the presence of a catalytic amount of an organo-aluminum compound and a catalytic amount of a catalytic complex prepared by a process which comprises:

(a) reacting a silanol having the formula:

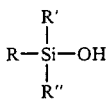

where R, R' and R" can be the same or different and are selected from the group consisting of aliphatic hydrocarbons having from 2 to 12 carbon atoms or phenyl or substituted phenyl where such substituents have from one to three alkyl groups having from one to four carbon atoms and wherein R" can additionally be selected from —OH with a magnesium dialkyl wherein each alkyl group can have from one to 12 carbon atoms to form a first reaction product;

(b) reacting said first reaction product with trichlorosilane to form a second reaction product; and (c) reacting said second reaction product with a metal compound having the formula:

$$MeX_4$$

where Me can be titanium or vanadium and wherein X is chlorine, bromine, or —$OR_1$ where $R_1$ is a hydrocarbon radical having from 1 to 10 carbon atoms and wherein at least two of the X substituents are selected from chlorine and bromine to form the desired catalytic complex and wherein said catalytic complex the molar ratio of Me to Si is from about 0.33:1 to 11:1 and wherein the molar ratio of Me to Mg is from 0.33:1 to 11:1 and wherein the molar ratio of the organo-aluminum compound to said catalytic complex is from 1:1 to 1000:1.

2. A process in accordance with claim 1 wherein the organo-aluminum compound is an aluminum alkyl and the $MeX_4$ in said catalytic complex is $TiX_4$.

3. A process in accordance with claim 1 wherein the organo-aluminum compound is an aluminum alkyl and the $MeX_4$ in said catalytic complex is $VX_4$.

4. A process in accordance with claim 2 wherein the molar ratio of Ti to Si in said catalytic complex is about 1:1.

5. A process in accordance with claim 3 wherein the molar ratio of V to Si in said catalytic complex is about 1:1.

6. A process in accordance with claim 4 wherein the silanol is triphenylsilanol and the dialkylmagnesium compound is dibutylmagnesium.

7. A process in accordance with claim 5 wherein the silanol is triphenylsilanol and the dialkylmagnesium compound is dibutylmagnesium.

8. A process in accordance with claim 1 wherein the molar ratio of the organo-aluminum compound to said catalytic complex is from 1:1 to 25:1.

9. A process in accordance with claim 1 wherein said catalytic complex is prepared at a temperature from about 25° C. to about 70° C.

10. A process in accordance with claim 1 wherein the molar ratio of the trichlorosilane to the magnesium in the first reaction product is from 1:1 to 10:1.

* * * * *